Sept. 20, 1960     B. A. BERGSTEDT     2,953,687
INSTRUMENT FOR THE MEASUREMENT OF RADIOACTIVE AEROSOLS
Filed June 4, 1956
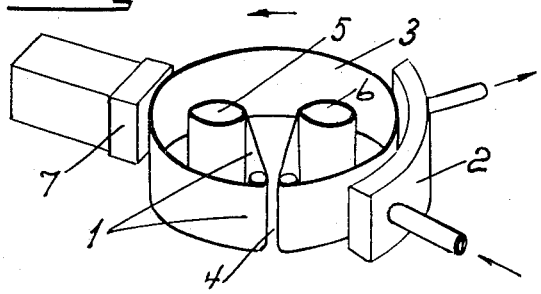
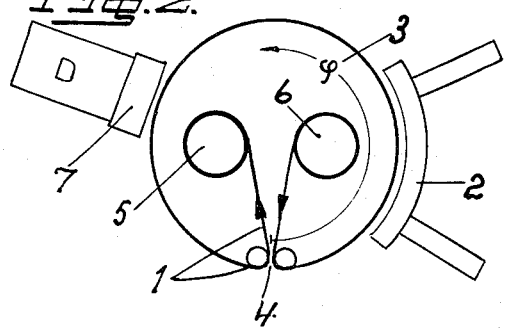

United States Patent Office

2,953,687
Patented Sept. 20, 1960

2,953,687

INSTRUMENT FOR THE MEASUREMENT OF RADIOACTIVE AEROSOLS

Bengt Allan Bergstedt, Solna, Sweden, assignor to Aktiebolaget Atomenergi, Lovholmsvagen, Sweden, a Swedish company Filed June 4, 1956, Ser. No. 589,133

Claims priority, application Sweden June 8, 1955

2 Claims. (Cl. 250—83.3)

This invention relates to an instrument for the measuring of radioactive aerosols.

The term radioactive aerosol refers in the following to a collection of small particles which are suspended in the air and which wholly or partly consist of ratioactive substances, in the solid or liquid state.

At present several different methods are used for the measurement of radioactive aerosols adapted to different measurement problems. The main types are the following:

(a) In the simple spot sample method a collection or precipitation of the particles is made in a filter or precipitator and the activity of the collected dust is subsequently measured. When the properties of the collecting device are known it is possible to measure and determine the radioactive content of the air of active substances of different half-lives by following the decay of the collected activity. A variant method is described in the literature in which method the samples are automatically changed. It constitutes an intermediate method to above method (a) and the next method (b).

(b) For monitoring the content of the air of activity of long half-lives the following method is suitable. The dust is collected on a tape which slowly passes the collector portion of the precipitator and then in front of a detector or detectors for the actual measurement of the radioactive radiation. The detector is placed at a given distance from the collector portion along the tape so as to warrant a given time delay between the moment of collection and the moment of measurement. The time delay is often chosen with regard to the content of natural aerosol activity, which has comparatively short half-lives. The concentration of the air of substances of long half-lives are of special interest in health-physics measurements, because the radiation dose (to the lung in this case) in a given time is the integral of the collected activity over the same time. The natural aerosol activity is often a few thousand times higher than the activity of long half-life, which one wants to determine. At the moment of measurement the intensity of the natural aerosol activity has decreased more or less, dependent on the time delay between the collection and the measurement. This method, however, does not give the right contribution to the radiation dose from activities which have half-lives that are short relative to the delay time.

(c) Often it is important to detect a sudden increase of long-lived aerosol activity, for instance in a laboratory or a building, with a minimum of delay with a background of high and varying natural aerosol activity. In this case it is practical to use a balanced system which comprises two channels, one of which for the air to be checked, such as the laboratory air and the other for a standard air, such as incoming ventilating air. When the two channels are adjusted for equal sensitivity the difference between the measured activities in the two channels will be a measure of the air contamination by radioactive aerosols. One drawback with present balanced systems is the fact that it is difficult to place the detectors inside the collecting device to obtain sufficiently short delay times.

The instrument according to the present invention can be used for all the different types of measurements mentioned above, and it can also give additional information on the properties of the activity collected. More particularly it can give a better measure of the contribution to the radiation dose by activity of short half-life.

The instrument according to the invention comprises a cylindrical drum, which is rotatable around its axis and has an axial slit, and two reels for a dust collecting tape so arranged in the drum that the tape can pass from a supply reel through the slit over a tape track on the periphery of the drum back through the slit to a take-up reel, which may be provided with a suitable device for the tape transport, and the instrument also comprises a dust collection device, precipitator, as well as one or a plurality of detectors for measuring the radioactive radiation placed in one sector each within the regions not occupied by the precipitator, said detectors of course facing the tape on the drum. The tape may be transported on the drum either in the same direction as the drum rotates or in the direction opposite thereto.

The invention will be described more in detail with reference to the attached diagrammatic drawing, in which Fig. 1 is a perspective view and Fig. 2 a plan view of an instrument according to the invention.

The collection of the dust is made on a tape 1, preferably by means of an electrostatic precipitator 2. The tape is moving on the outside of a drum 3, which is rotatable about its axis at a preferably constant velocity that can be set to different values, and passes from a supply reel 6 through a slit 4 in the wall of the drum to a take-up reel 5 for the tape. The precipitator is facing the tape on the drum and may have a large extension along the periphery thereof. A detector 7 (only one shown in the figure) is placed in the sector of the drum not occupied by the precipitator.

This instrument is intended to operate primarily in the following way. The drum rotates at a constant speed with a number of revolutions per minute which is small as compared to the integrating time constants in the output circuits of the detectors. The tape is also caused to move on and relative to the drum at a constant but controllable speed. A mathematical analysis then shows that the counting rate of the detector is directly proportional to the half-life of the activity collected if the half-life is short in comparison to the time of revolution of the tape on the drum. The system has a low sensitivity for activity of short half-life and a constant sensitivity for activity of long half-life.

When applied to differential measuring between two channels, i.e. to a balanced system, the tape is only made wide enough to allow for two parallel channels. When used as a constant-delay system the drum is stationary and different delay times are obtained by phasing the drum with respect to the precipitator and the detectors.

What is claimed is:

1. An instrument for measuring the activity of radioactive aerosols comprising a substantially cylindrical drum rotatable about its longitudinal axis, said drum having an axial slit in the peripheral wall thereof; a supply reel and a take-up reel positioned within said drum; a dust collecting tape wound upon said supply reel, one end of said tape being fed outwardly from within said drum through said slit about the outer periphery of said drum, into said drum through said slit, and being wound upon said take-up reel; an electrostatic precipitator positioned adjacent the outer periphery of said drum for depositing the aerosol on said tape; a detector for measuring the degree of radioactive radiation, said detector being positioned adjacent the outer periphery of said drum and peripherally spaced from said precipitator, and means for rotatably driving said drum at a constant speed.

2. An instrument as defined in claim 1 including means for driving said take-up reel to wind the tape thereon.

References Cited in the file of this patent

UNITED STATES PATENTS

| | | |
|---|---|---|
| 2,576,616 | Livingston | Nov. 27, 1951 |
| 2,751,505 | Anderson | June 19, 1956 |
| 2,756,840 | Maas | July 31, 1956 |